United States Patent Office 3,052,140
Patented Sept. 4, 1962

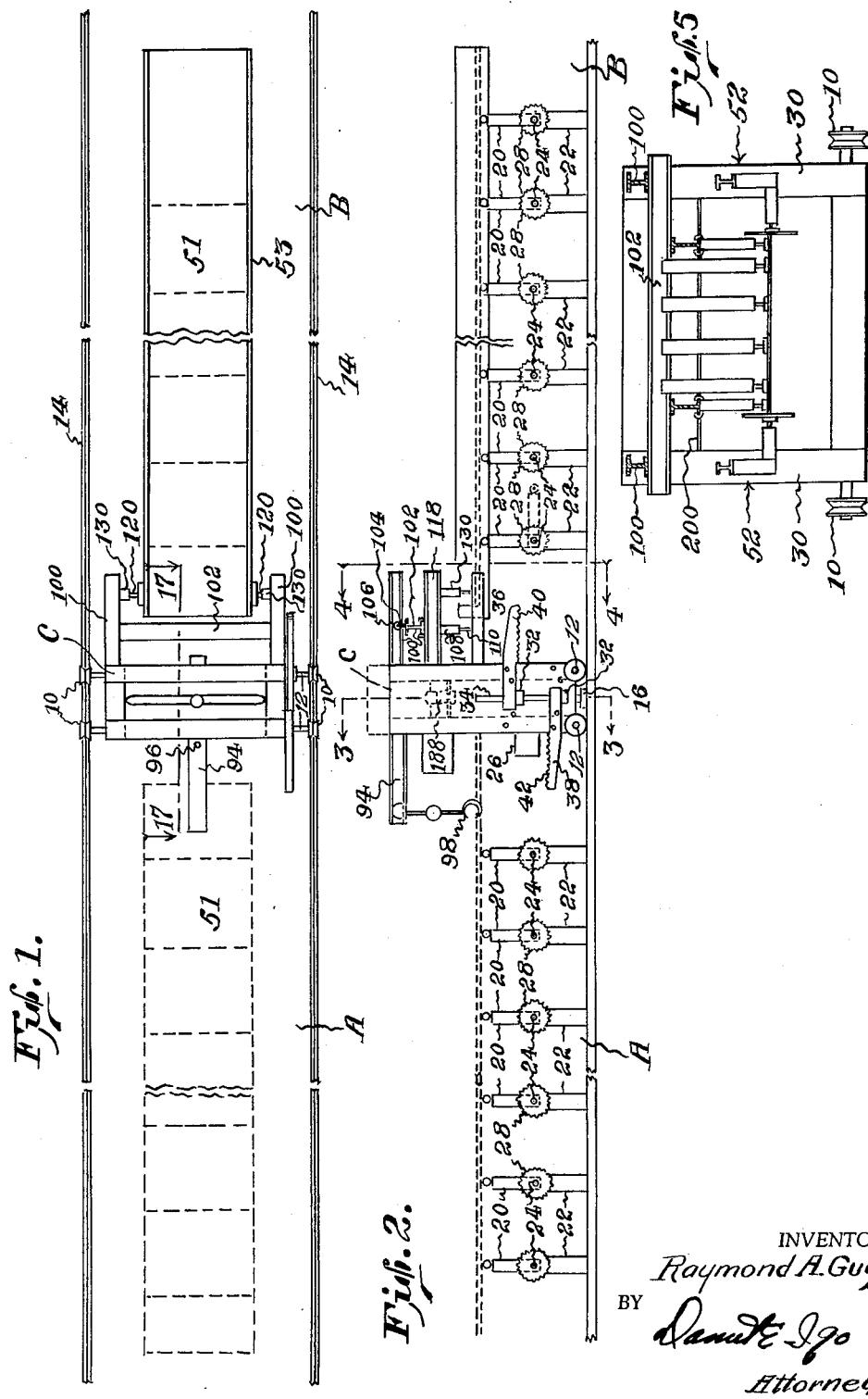

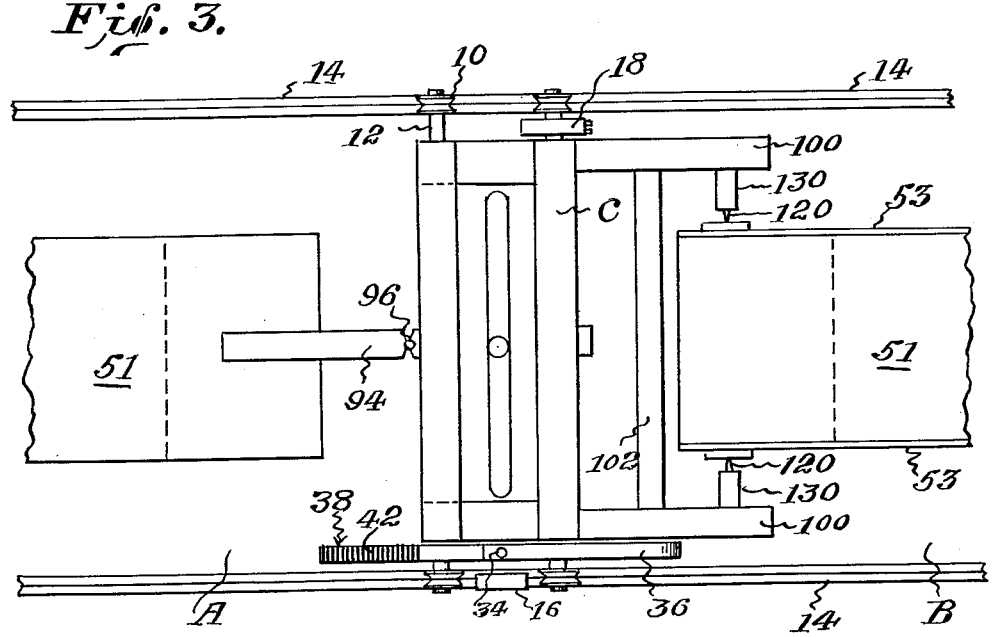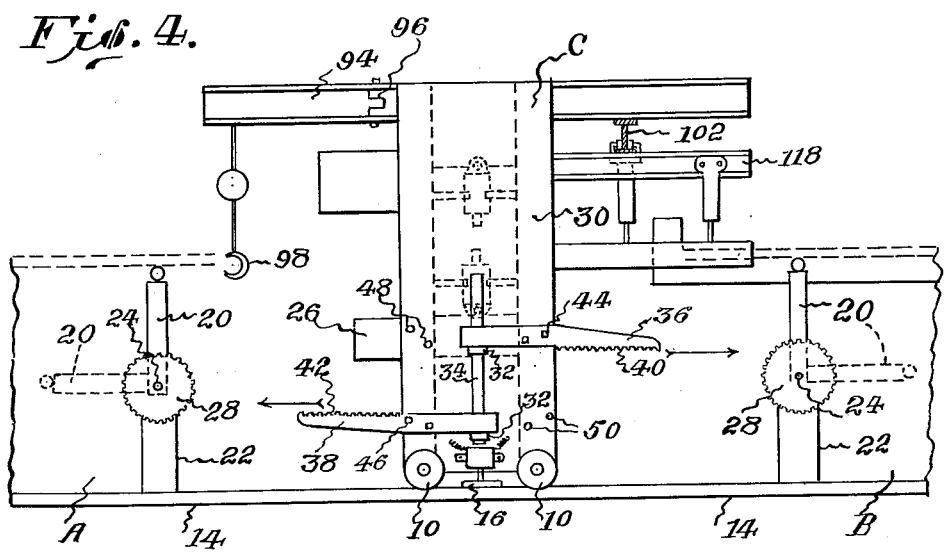

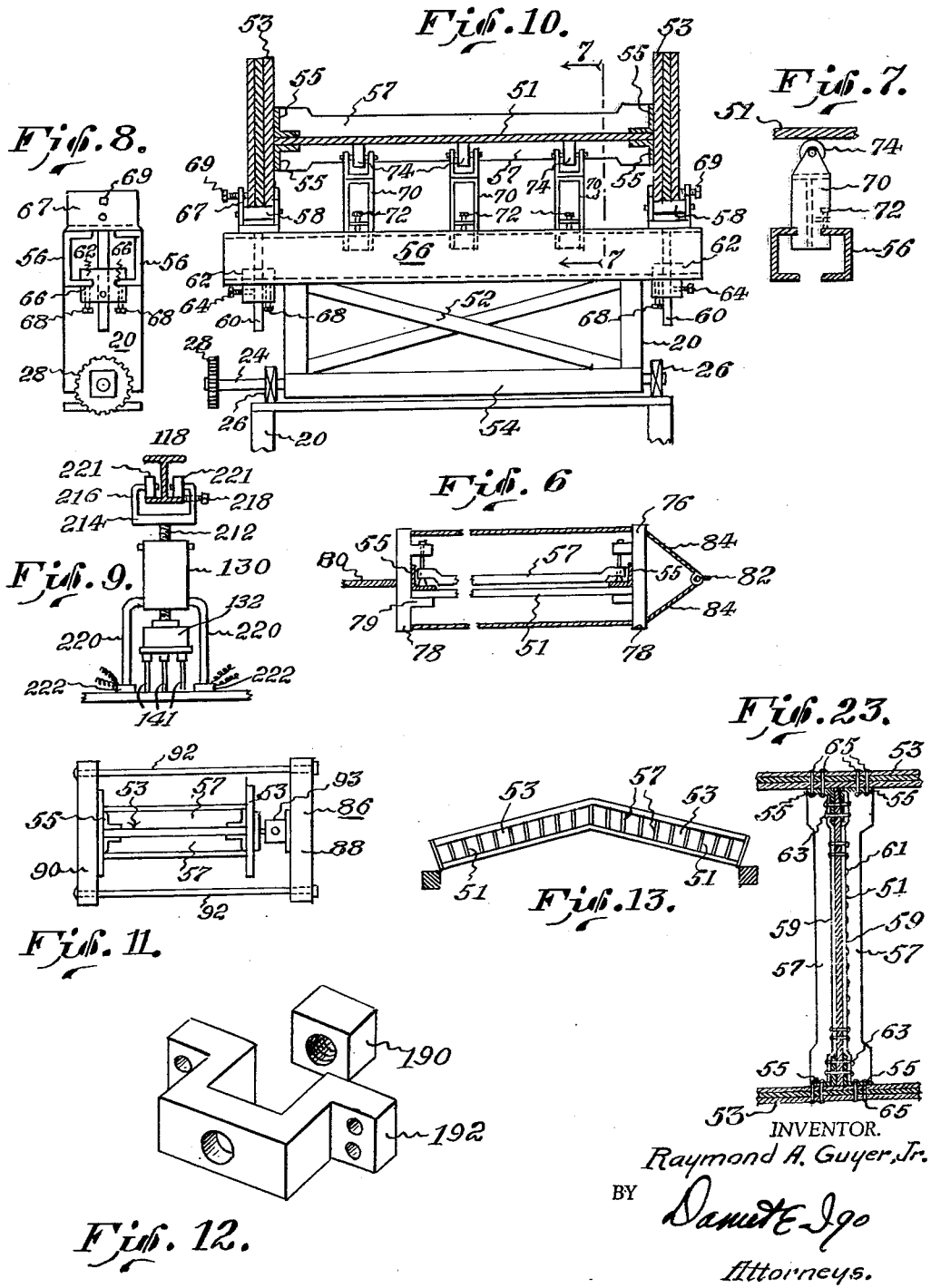

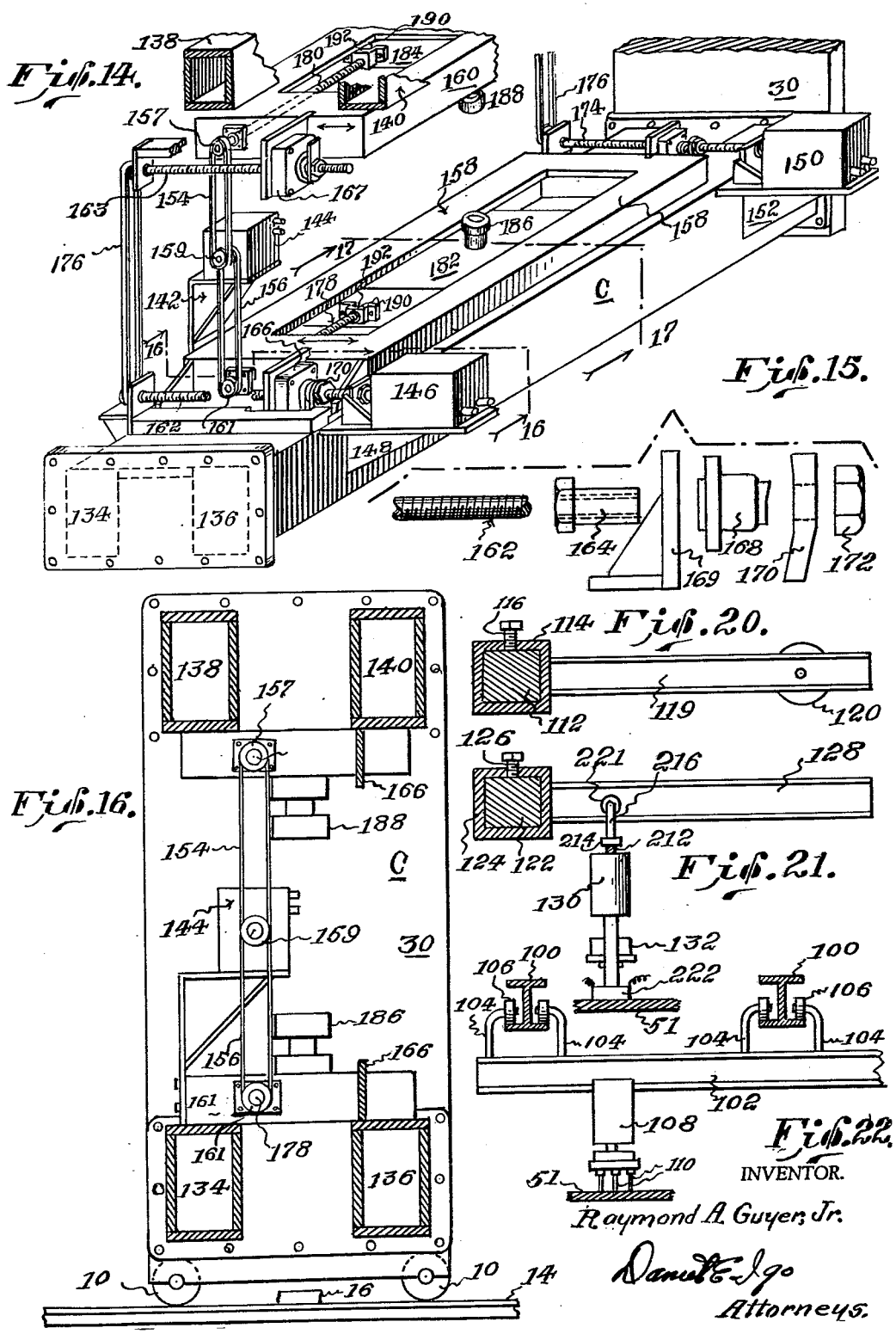

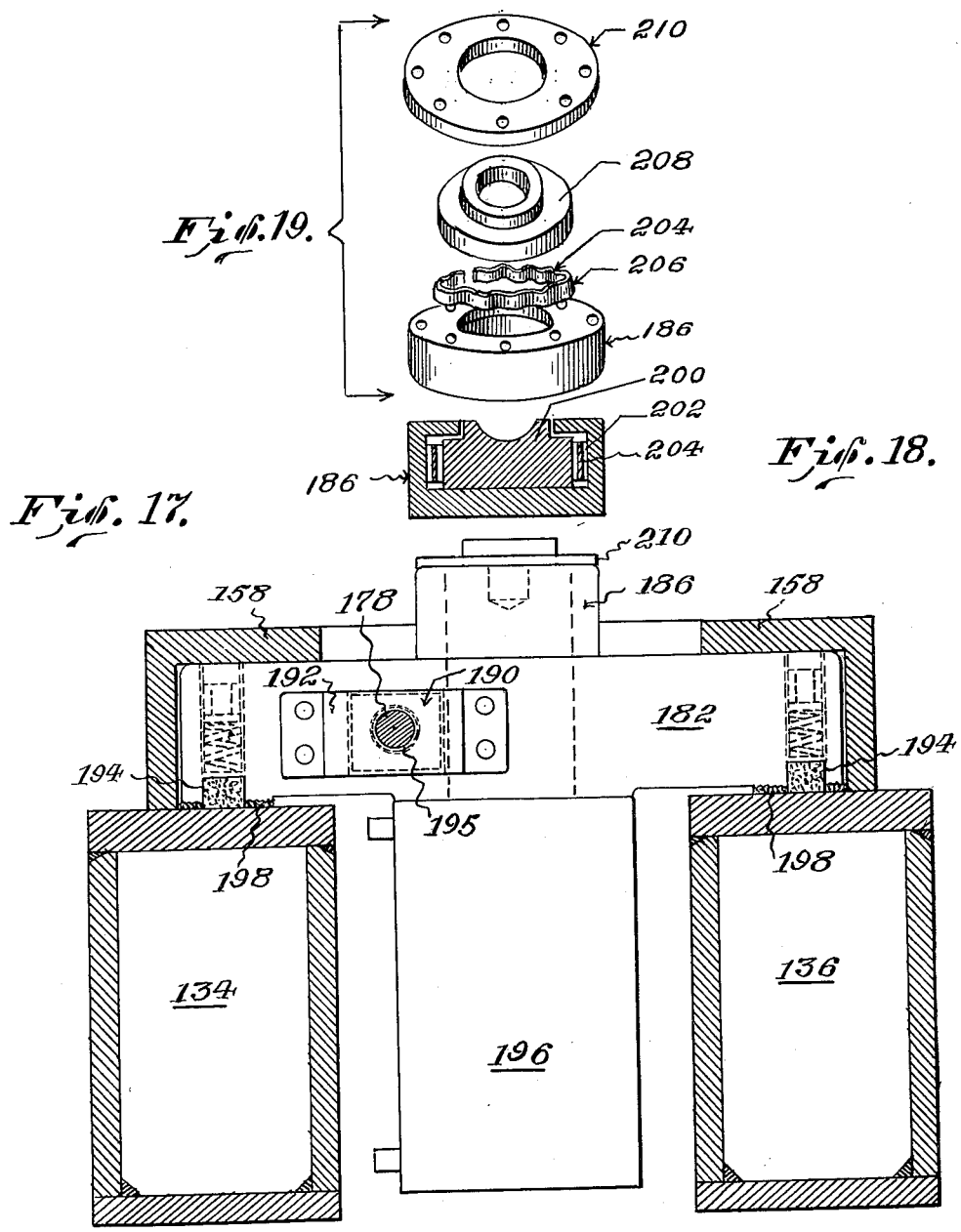

3,052,140
APPARATUS AND METHOD FOR MANUFACTURE OF RIVETED PLATE GIRDERS
Raymond A. Guyer, Jr., Paoli, Pa., assignor to Lukens Steel Company, Coatesville, Pa., a corporation of Pennsylvania
Filed Aug. 8, 1958, Ser. No. 754,024
13 Claims. (Cl. 78—49)

This invention pertains to a method and apparatus for fabricating riveted plate girders, which includes initially attaching by tack welding or with suitable clamping means the various parts in place. A movable gantry is then moved along the work and the various operations of drilling and riveting are performed on the assembled work pieces.

An object of the invention is to provide a substantially stationary workpiece and a movable gantry for performing the several operations on the workpiece.

An additional object is to provide means for riveting in situ from various directions and with multiple drilling operations whereby to attach the flange angles to the cover plate and web plate, to fabricate the cover plate if it consists of one or more layers of metal, and to attach the stiffener angles to the cover plate or flange angle, and to the web plate.

A further object is to provide novel mechanism for riveting the parts to each other and to compensate for the camber of the plate girder during such operations.

Another object is to provide novel supporting means for the girder comprising a plurality of separate supporting structures, which structures are automatically moved out of the way of the gantry as it progresses along the length of the girder.

An additional object is to provide in a gantry mechanism means for adjusting the gantry for the fabrication of girders of different widths, and additional means for adjusting to girder cover plates of different widths, whereby riveting operations may be performed in such manner as to take care of vertical as well as horizontal adjustments for different sized and different proportioned girders.

A further object is to provide novel means for quickly adjusting the several riveting heads to proper position for different sized girders.

Yet another object is to provide an automatic adjustment for the confronting riveting heads, including spring means for permitting relative movement of the opposed riveting elements.

Other objects will appear hereinafter throughout the specification.

In the drawings:

FIGURE 1 is a top plan diagrammatic view of the apparatus of this invention, omitting the supporting tables;

FIGURE 2 is a side elevation of the structure shown in FIGURE 1, with the supporting tables shown in place;

FIGURE 3 is an enlarged top plan view broken away of the gantry shown in FIGURES 1 and 2;

FIGURE 4 is a side elevational view of the structure shown in FIGURE 3;

FIGURE 5 is a front elevational view of the gantry showing drills supported thereon;

FIGURE 6 is a vertical sectional view partly in full lines of the means for reversing the position of the girder;

FIGURE 7 is a detailed vertical sectional view taken on the line 7—7 of FIGURE 10;

FIGURE 8 is a detailed side elevational view of one of the supporting tables and its operating pinion;

FIGURE 9 is a detailed view partly in section of one of the multiple drills and supporting means therefor;

FIGURE 10 is a front elevational view partly in section and partly broken away of the beam and one of the supporting tables therefor;

FIGURE 11 is a front elevational view of the cover plate clamps;

FIGURE 12 is an exploded view of the nut lock mechanism shown in FIGURE 14;

FIGURE 13 is an exaggerated side elevational view showing the camber of the girder;

FIGURE 14 is a perspective view with parts shown in section and with other parts omitted for the sake of clarity of the interior of the gantry;

FIGURE 15 is an exploded view of one of the motor feed shafts and the parts connected thereto shown in FIGURE 14;

FIGURE 16 is a vertical sectional view taken on the line 16—16 of FIGURE 14;

FIGURE 17 is a vertical sectional view on the line 17—17 of FIGURE 14;

FIGURE 18 is a vertical sectional view of one of the automatically adjustable riveting heads;

FIGURE 19 is an exploded view showing the parts of the head illustrated in FIGURE 18;

FIGURE 20 is a view partly in perspective of one of the supporting bars, showing a beam extending therefrom, and the multiple cover plate drill supported thereby;

FIGURE 21 is a view similar to FIGURE 20 but showing the flange drill supported by the beam;

FIGURE 22 shows the transverse supporting I-beams for supporting the longitudinal beam, which latter supports the multiple web plate vertical drilling units; and FIGURE 23 is a vertical sectional view of a completed girder.

General Construction

The invention relates to an apparatus and method for providing an economical method and apparatus for the manufacture of large, rigid riveted plate girders with a minimum of handling of the girder component parts, and within a minimum of working space. Heretofore plate girders were made by punching holes in the respective parts of the girder, following which the parts were assembled to form the girder and held together by rivets. Prior to riveting, however, it was necessary to ream the holes of the several parts in place in order to assure a solid rigid joint. Such a girder when completed is illustrated in FIGURE 23 herein. It will be seen, as illustrated in FIGURE 23, that the typical girder comprises one or more cover plates at opposite ends thereof, separated by a web plate. These parts are usually held together by rivets which connect flange angles located at the juncture of the web plate with the cover plate, each of which flange angles are riveted to the cover plates and web plate. A typical girder, made in accordance with the process and apparatus of this invention, may be twelve feet deep and one hundred fifty feet long. The web plate in such a girder is preferably of one continuous sheet of metal, approximately one hundred fifty feet long, the girder having a depth, including the cover plates, of approximately twelve feet. However, the apparatus of this invention is adjustable to compensate for girders of different depths and whereby to fabricate a girder having cover plates that are of different thicknesses and widths.

Suitably spaced on opposite sides of the web plates along the longitudinal length thereof are stiffener members (flange angles) which are substantially the same length as the width of the web plates. These stiffener members are riveted both to the web plates and to the cover plates.

The present invention relates to riveted girders fabricated by initially bringing together or assembling the component girder parts and holding said parts either by tack welding or by clamping means, such as hydraulic clamps, or both, so that the various parts are in proper assembled relationship for the fabrication of a girder in situ. Subsequently, by means of drilling aligned holes, without disturbing the relationship of the parts, the assembly is ready for the riveting operation. The riveting operation directly follows the drilling operation, in order to make one solid rigid plate girder.

It will be noted that one of the advantages of this method of operation is that plate girders may be fabricated without requiring the respective pieces thereof to be constantly moved from one position to another, in accordance with present practice for the fabrication of plate girders.

The girder component parts are not moved during the several operations except for a 180° rotation of the web plate (with the stiffener angles and flange angles mounted on one side) on its longitudinal axis. This method distinguishes from the present day method of moving the web plate, web stiffener angle, cover plates, and flange angle through a stationary punch press and then assembling these parts, and reaming and riveting, as noted above.

In the present invention the work remains stationary except that after one-half the operation is completed, the web plate (with attached stiffener angles and flange angles) is rotated 180° on its longitudinal axis. Consequently considerable space is saved over the conventional method and use of the punch presses which require entrance and takeaway space.

The inventive concept envisages the in-place assembly of the various parts and the movement of a gantry means along the tracks which extend longitudinally of the workpiece. The gantry mounts the drilling and riveting mechanisms. As the gantry moves progressively to a series of stations, where it stops to perform riveting or drilling operations, the work supporting means adjacent the gantry is automatically moved out of the way of the gantry so as not to interfere with the movements thereof. After the gantry has passed beyond the work supporting means, said work supporting means will each individually be restored to its original position in load-supporting engagement with the work. The gantry is power driven and is mounted on wheels, which preferably run on tracks longitudinally of the workpiece. Means are provided for holding the gantry against movement during each drilling or riveting operation. A preferable arrangement will include a plurality of stations, one station to be used for assembly and tack welding or clamping the various elements in position for one plate girder, another station to be used for supporting a second plate girder.

While the parts are being assembled at the first station, drilling and riveting operations are carried on at the second station. When the latter operations are completed the girder is removed from the second station, and the parts of a new girder are assembled at this second station by tack welding and/or clamping the parts in proper position, while the gantry proceeds to the first station for drilling and riveting operations. The work is completed by moving the gantry to separate stations over the girder in order to drill and rivet the parts in final position. The operation is repeated of assembling, drilling and riveting, at as many stations as necessary to complete the girder, after which the completed girder is removed and the assembling operation begins over again for the fabrication of the instant plate girder.

It will be noted that the tracks for the gantry extend so that the same may move over the partially completed girder at either of the stages. Any number of stations may be provided. The means for supporting the girder, both during the pre-assembly operation of tack welding or clamping and during the drilling and riveting operations comprises a series of spaced tables or supporting members which are automatically moved out of the way of the gantry as it advances along the length of the girder.

Referring now to the drawings, as will be noted in FIGURES 1 and 2, A and B are stations for the assembly and fabrication of separate plate girders, and C is the gantry which moves from station A to station B. In the event there are other stations, the gantry may move to them, after having moved from one of the other stations. Preferably the gantry is provided with a plurality of supporting wheels or rollers 10 mounted on suitable shafts 12.

The wheels are mounted on tracks 14 which extend from one station to the other, in order that the gantry may perform one series of operations at one station to complete the fabrication of a girder and then be moved to another station to complete the fabrication operations at that station. At this time the parts of a second girder are being assembled and either clamped or tack welded or both, so that the parts will be in proper position for drilling and riveting when the gantry moves again to the station where these parts are being assembled and affixed to each other.

It will be understood that each girder after completion will be lifted or otherwise moved from the station after the riveting operation has been completed.

Preferably when moving along the tracks at one of the stations and during the drilling and riveting operations, the gantry is held in a stationary position, such as by a magnetic brake illustrated at 16 in FIGURE 4. The gantry is propelled by any suitable means along the tracks, such as by a reversible electric motor, illustrated at 18 in FIGURE 3.

The apparatus is provided with a plurality of individually mounted supporting means, hereinafter referred to as spaced tables or work supports, which are shown at 20 in FIGURES 2 and 10. Each table 20 is mounted on a fixed foot or support 22, each of which is located adjacent one of the tracks.

Each table is provided with a shaft 24 in bearings 26, which latter are suitably mounted on supports 22. On one end of each shaft 24 is mounted a pinion 28.

Various types and sizes of girders may be fabricated by utilizing the method and apparatus of this invention. However, for purposes of illustration a girder of one specific type has been shown in completed form in FIGURE 23. This girder comprises a web plate 51. The cover plates 53 may comprise a plurality of layers, as shown in FIGURES 10 and 23. The means for attaching the web plate to the cover plates comprises four flange angles 55, which are L-shaped in cross section. Stiffener angles which also may be L-shaped or T-shaped in cross section are shown at 57. It will be noted that the upper and lower ends of each stiffener angle are bent to accommodate the flange angles. The flanges of the stiffener angles which lie against the sides of the web plate are indicated at 59. These stiffener angles by means of the flanges 59 are riveted to the web plate by rivets 61, and rivets 63 extend through portions 59 of stiffener angles 57, a pair of flange angles 55, and the web plate 51. The cover plates 53 are attached to flange angles by rivets 65. It will be understood that each cover plate may consist of one or more layers and that the web plate may also consist of more than one ply or layer (not shown).

The structure shown in FIGURE 6 illustrates one of the web plate turn-over members. Each of these is located between a pair of tables, following the assembly of the stiffener members and flange angles. Each turn-over member 76 comprises a pair of clamping ends 78 having a wire rope 80 connected to one of the ends 78 and a crane hook 72 having a cable 84 connected to the said clamping hook of the other of the clamping ends 78, as explained hereinafter. These turn-over members 76 should be removed before the cover plates are applied, and these are held in position by the clamping screws 69, shown in FIGURE 10, but the various girder elements are clampingly held to each other by the clamping frames, one of which is shown at 86, as shown in FIGURE 11.

There are a plurality of these, and they are assembled to take the place of the turn-over members 76. Each frame is provided with oppositely located backing members 88 and 90, these being held to each other by tie rods 92. The cover plates are forced toward each other and into engagement with the web plate and stiffener members by a hydraulic clamping member 93. It will be understood that in place of the hydraulic clamping member 93, comprising a conventional piston, cylinder and fluid lines not shown, screw jacks or air cylinders may be used whereby to exert sufficient force to clampingly hold the two cover plates 53 in correct position on the partially assembled girder, consisting of the web plate 51, angle members 55, and stiffener members 57.

FIGURE 13 is a side elevation of a girder showing a camber thereof. It will be understood that in actual practice the camber will not be as excessive as shown in this figure, the illustration of FIGURE 13 being solely for the purpose of showing that girders of this type frequently are cambered. The apparatus and method of this invention are adapted to drill holes and perform riveting operations on girders even though they are cambered.

*Work Supporting Tables*

As noted above, there are a plurality of work supporting tables 20, each supported on a foot 22, these tables being located on opposite sides of the gantry, as viewed in FIGURES 1 and 2. Each table is moved from the full line position to the dotted line position as the gantry moves over them, as seen in FIGURE 4, and the construction of each of these tables, as shown in FIGURES 7, 8 and 10, consists of a framework 52 extending from the base 54, which latter is mounted on shaft 24 for pivotal movement with other parts of the table. Supported on the upper part of the framework are a series of U-shaped beams 56, and supported adjacent the opposite ends of the beams are rollers 58.

The rollers 58 are each mounted on a vertical rod 60 which is adjustably held in the block 62 by the screw bolts 64. Each rod 60 mounts one of the rollers 58 as seen in FIGURE 10.

Lateral adjustment of the blocks 62 along the flanges of the beams 56 is accomplished by means of the slots 66, as seen in FIGURE 8, which accommodate the lower flanges of the beams 56 and permit each block to be individually adjusted along the flanges of the beams and held in any position of adjustment by the screw bolts 68.

It will be understood, therefore, that the rollers 58 may be adjusted both vertically and laterally for fabricating girders which have different web widths and cover plate widths. Means are also provided for individually supporting the web plate of the girder, as shown in FIGURES 7 and 10. This means comprises a plurality of spaced vertically extending supporting members 70. Members 70 are adjustable longitudinally of said beams by means of the screw bolts 72. The upper portion of each of the supporting members is provided with a roller 74, which directly engages the web plate of the girder between a pair of longitudinally spaced stiffener members on the under side of the web plate.

Extending upwardly from beams 56 and mounted thereon are upwardly extending flanges 67, one of which mounts the clamping bolt 69. These bolts are tightened during assembly and again when the gantry has reached the position for drilling and riveting operations, including riveting the cover plates, flange angles and web plate to each other, and the stiffener angles. At both times the screw bolts 69 are tightened to clamp the girder in stationary position for such operations. It will be understood that the conventional air or fluid pressure clamping means could be substituted for the clamping bolts 69.

*Assembly Method*

At the start of the operation, when the parts are assembled at station A, the web plate 51 is placed in a horizontal plane on a plurality of the pivoting supports 20, with the supports located in a vertical position, as shown in FIGURE 2. The flange angles 55 are then clamped or tack welded to one or both sides of the web plate 51. The web stiffeners 57 are then tack welded to the upper surface of the web plate and to the oppositely positioned flange angles on this upper surface.

It will be understood that at this time a plurality of the turn-over members shown in FIGURE 6 are affixed to the web plates and upper stiffener members, each of them being located between a pair of tables or supports 20.

The web plate with the attached flange angles and web stiffeners is then rotated 180° on its longitudinal axis by the turn-over members shown in FIGURE 6. Each plate turn-over member is controlled by a crane operator who uses the wire steering rope 80 for controlling the rotation of a turn-over member 76 about its longitudinal axis. The turn-over members are operated in unison whereby the web plate may be raised and then rotated about a 180° angle on its longitudinal axis. With a web plate and re-enforcing members attached by clamps as shown in FIGURE 6, there being a plurality of said spaced clamps located between tables 20, one or more crane hooks are attached at 82 and the right end of each turn-over member is lifted so that the web plate is in a substantially vertical position. The operators then grasp the rope 80 of each turn-over member and swing the bottom portion over, or clockwise, as seen in FIGURE 6. The crane or cranes then lower the turn-over members with the web plates and attachments thereto to the tables in order to insure that what was the underside of the web plate now becomes the upper side thereof. It is then lowered to the position where it again rests upon the supports 20. In the event the flange angles have only been attached to one side of the web plate, they are now attached to what is at this time the upper surface of the said web plate. The spaced stiffener angles 57 are then placed on this surface and held in position by tack welding and/or clamping members. The web plate will now have attached to its opposite sides the flange angles 55 and web stiffener angles 57.

The turn-over members may then be removed from the assembly line. The two cover plates 53 are then placed in clamp 67, as shown in FIGURE 10, and are clamped rigidly in position by the screws 69, which serve to properly position the cover plates inasmuch as they may be adjusted vertically and horizontally to accommodate different sized cover plates and to position the cover plates against web plates of different widths.

Additionally, a plurality of cover plate clamps 88 are utilized between pairs of tables and in place of the turn-over members 76 of FIGURE 6.

After the turn-over members 76 have been removed, the cover plates are then placed in the clamp 67, shown in FIGURE 10, and rigidly held by the screw 69. At this time also the clamping assembly frame 86 is utilized to rigidly position the parts with relation to each other. The assembly frame 86 shown in FIGURE 11 is used solely to assist in clamping the parts in position and each of these, when used, is located between the tables shown in FIGURE 10. The purpose of the assembly frame 86 is to rigidly hold the parts to each other including the web plates and cover plates after tack welding, and during drilling operations. As indicated previously, these frames 86 are used to take the place of the turn-over members 76. With parts now all rigidly held to each other, the tack welding or clamping operations with respect to the parts are completed, following which the frames 86 are removed, and the clamping screws 69 are also removed, in order that the gantry when it is moved into position for drilling and riveting operations may cause each table to be lowered if the pinion 28 is engaged by one of the arms 36 or 38.

With both cover plates and all of the flange angles and stiffener plates in place on opposite sides of the web plate, and held rigidly in their proper positions by tack welding and/or clamping means (not shown), the gantry is moved toward the partially fabricated girder and the drilling and riveting operations are completed by the gantry. Several turn-over members have been previously removed from the girder, and the entire weight thereof is borne by the pivoted tables 20.

Gantry Construction

Referring now to the gantry C, said gantry is provided with vertical supporting sides or walls. As seen in FIGURES 2, 3, and 4, one gantry wall 30 supports by means of brackets 32 an upstanding pivot 34, which supports a pair of spaced arms having teeth 40 and 42, forming rack members respectively, on their confronting faces. The spaced arms 36 and 38 may be retained in the position shown in FIGURES 2 and 4 by bolts 44 and 46, which bolts extend through aligned holes or openings in the arms 36 and 38 and through the wall 30 of the gantry, so as to retain both arms in fixed position. However, when it is desired to move the gantry in the opposite direction, these bolts are removed and the upper arm 36 is moved about the pivot 34 to the left, and the lower arm 38 is moved about the same pivot to the right, the bolts 44 and 46 being utilized to retain these arms in the holes 48 and 50. This is for the purpose of causing operation of the tables 20 in opposite directions, to and from the position shown in full and dotted lines in FIGURE 4.

Should the parts be arranged as indicated in FIGURE 4, and assuming that the gantry is moving to the right, as shown by the rightmost arrow, as the gantry advances the teeth 40 engage each pinion 28 and cause the table to move to the dotted line position, so that table 20 will not interfere with the operations or movements of the gantry. After the gantry has passed, when moving in the same direction, the pinion 28 is engaged by teeth 42 which returns the table 20 to its vertical position. This operation continues until the gantry has moved along the entire length of the girder to thereby complete all of the drilling and riveting operations.

After the gantry has progressed down the length of the girder in this fashion, it becomes necessary to then return the gantry in the opposite direction, as indicated by the leftmost arrow in FIGURE 4. At this time bolts 44 of rack (or arm) 36 and bolts 46 of rack 38 are removed and both racks 36 and 38 are pivoted 180°, following which bolts 44 are placed in holes 48 and bolts 46 are placed in holes 50. The gantry is then moved to the position of FIGURES 1 and 2. Various parts for the next girder have been assembled and clamped in position at station A, and the gantry continues its leftward movement to complete the drilling and riveting operations on the assembled girder at this station. At the end of the run in this direction the racks are again reversed and the gantry will again move to the position shown in FIGURES 1 and 2. Assuming that the girder which has been completed will be removed, and that a new assembled girder with its elements tack welded and/or clamped in position is resting upon the tables 20 located to the right of the gantry at station B, the gantry will continue its movement to the right.

The gantry is constructed so as to perform riveting operations on various sized girders, and is adapted to be adjusted to take care of girders, the web plates of which are of different lengths, and the cover plates of which are also of different lengths, the gantry construction being best illustrated in FIGURES 1 to 4, 9, and 14 to 22.

As previously stated, the gantry is mobile, in that it is mounted on wheels 10 rolling on tracks 14 along the length of one and preferably a plurality of stations. The gantry is equipped with independent means for propelling it along the tracks and for retaining the gantry in a stationary position at any location along the tracks.

The gantry uses a plurality of gang drills and riveters for performing its operations in various angles and positions of adjustment. Rivets 65 for one cover plate call for horizontal movements of the drills and riveters, while on the other cover plate the same operation must be performed by other drills and riveters, inasmuch as these cover plates are spaced from each other. The rivets 63 must also be placed in holes which are drilled vertically. Means for adjusting all of the gang of drills and riveters must be provided in order to fabricate girders of different sizes, i.e. where the distance between the cover plates will vary because of the height of the girder and the plates themselves will vary in length.

It will be understood that each of the drilling and riveting units is preferably of the gang type, i.e. each contains a plurality of drilling units and riveting units so that a number of operations may be performed simultaneously. The means for supporting these various units in adjustable positions will now be described.

Extending to the left from the gantry as viewed in FIGS. 1 and 2, is a beam 94 which is pivotally connected at 96 to the gantry by a vertical pivot. Supported from said beam is a conventional C riveter 98. This riveter is for the purpose of riveting cover plates 53 to the flange angles. It is only necessary to move the gantry each time a distance of between three and four feet, which is approximately the center distance of the web stiffener angles 57.

Extending to the right of the gantry, as seen in FIGURE 2, is a spaced pair of I-beams 100. These I-beams are fixed to the gantry and move with the same. A rail 102 is provided with pairs of curved arms 104, with rollers 106 mounted on the top extremity thereof, as seen in FIGURE 22. These rollers are adapted to permit adjustment in a longitudinal direction of the rail on the I-beams 100. The rail, therefore, is movable in a direction parallel to the girder for a distance corresponding to the length of the beams 100, say of about six feet. Adjustably mounted on the rail 102 so as to be adjusted transversely to the direction of adjustment along the beam 100 is a multiple drill support 108 for supporting the drills 110. These drills are used for simultaneously drilling a series of holes in a vertical direction for receiving the rivets 61 and 63, and it will be appreciated that all of the vertical drilling may be accomplished along the width of the girder by these drills, one or more gangs of which may be mounted on the rail 102. As soon as all of the holes have been drilled for the reception of the rivets 61 and 63, the rail may be moved two or three feet, amounting to the distance between the stiffener members, and another set of holes are drilled in the next pair of stiffener members 57, with their corresponding flange angles 55, and through the web plate.

A rod 114 extends transversely of the gantry, which rod is surrounded by a sleeve 114 having locking bolt 116 for adjustably maneuvering the sleeve along the length of the rod 112. Extending outwardly, and in the longitudinal direction of the girder, is an arm 119, the end of which has adjustably mounted thereon a cover plate drill 120, as shown in FIGURE 20. It will be understood that the structure shown in FIGURE 20 is duplicated on opposite sides of the gantry, in order to drill horizontal apertures through the spaced cover plates 53. The flange drill mechanism is shown in FIGURE 21 and resembles the structure shown in FIGURE 20, which supports the cover plate drill means. As shown in FIGURE 21, there is a squared rod 122 having a squared sleeve 124 surrounding the same. The sleeve is adjustable along the length of the rod and is held in position by the locking bolt 126. The sleeve supports the arm 128 and adjustably mounted on this arm is the motor 130 for the gang drill 132. This drill is used principally for drilling holes through the flanges 55, stiffener angles 57 and web plate 51, for the reception of the rivets 63.

Referring now to FIGURES 9 and 21, which show the drills which may preferably be used for drilling holes for the rivet 63 that will connect the web plate, flange angles, and stiffener members to each other, 130 as heretofore stated shows the drill motor which may be of any conventional type. The drill motor is mounted by a flexible connection 212 to a yoke 214 having arms 216 with rollers 221 on the upper ends thereof. These rollers, arms, and the motor suspended therefrom may be retained in position by the screw lock 218, which may be tightened against the lower flange of the beam 118 for maintaining the parts in position while drilling.

The motor 130 is provided with mechanism supporting arms 220 that support the magnets 222. Upon energization, these magnets will firmly attach the entire riveting mechanism to the workpiece, such as the web plate, during the drilling operation. The rollers 221 when released by screw lock 218 permit the entire drilling unit to be moved longitudinally of the workpiece, namely the girder. For transverse adjustment, as heretofore explained, the beam 128 and the drilling unit supported thereby may be adjustably moved along the rod 122 and the sleeve 124 fixed in position by the screw bolt 126.

It will be understood that the magnetic clamping mechanism shown in FIGURES 9 and 21 may be utilized for any of the other drilling units described herein.

Supported between the spaced gantry walls 30 are four parallel connecting supporting members or boxings 134, 136, 138 and 140. By means of bracket 142, hydraulic motor 144 is supported; motor 146 is supported on bracket 148; and motor 150 is supported on bracket 152, as shown in FIGURE 14. While all of these motors are preferably hydraulic motors and may be operated by using a conventional fluid drive and control means, such as valves, pipe lines, and pumps, it will be understood that electrical motors and switches may be substituted for these hydraulic motors.

Motor 144 drives belts 154 and 156, which includes driving pulleys 159 and driven pulleys 157 and 161, as seen in FIGURES 14 and 16, which comprise the timing belts for the mechanism hereafter to be described. Boxings 134 and 136 support the rectangular guide 158, and boxings 138 and 140 support guide 160. It will be noted that the guides and the parts operatively connected thereto are duplicates of each other, except the lower one contains an upwardly facing riveter member 186 and the upper one supports a downwardly directed riveter member 188, one of these riveter members being shown in detail in FIGURES 18 and 19, hereinafter described.

Hydraulic motor 146 drives power screws 162 and 163, shown in FIGURES 14 and 15, the former of which extends through the nut 164. The nut 166 is rigid with the guide 158, and nut 167 is rigid with guide 160. Brackets 169 are on opposite sides of screw 162 and are rigid with the boxings. The left bracket forms a bearing for screw shaft 162 and lower pulley for belt 176 which is driven by screw shaft 162. Mounted on the nut 164 is the self-aligning flange 168 and the guide 170, the latter being provided to prevent the bearing from turning during the operation of the power screw. 172 indicates a nut for locking the parts in position. It will be understood that the motor 146 and the power screws and parts connected therewith, upon operation of the motor will cause the guides 158 and 160, through nuts 166 and 167, to move toward and from the motor 146.

Motor 150 through power screw 174 and belt 176 through mechanism identical to that heretofore described drives guide 160 toward and away from the motor 146, the parts being the same, but not shown in detail for purposes of clarity in the drawings.

Motor 144 timing belts 154 and 156 simultaneously drive power screws 178 and 180 which feed riveter supporting mechanisms 182 and 184, respectively. These latter support the oppositely facing rivet heads 186 and 188. The connection between each power screw 178 and 180 and its riveter supporting mechanism 182 and 184 comprises self-aligning nut mechanisms indicated at 190 and 192, respectively.

The self-aligning mechanisms 190 and 192 comprise nut 190 and bracket 192 having an oversized hole 195 for the reception of the screw 178, so as to permit self-aligning.

Referring now to FIGURES 17, 18 and 19, although only the lower riveting support and riveting head is shown, it will be understood that the upper riveting support and head are the same as that illustrated in these figures. The riveter supporting mechanism is biased upwardly (the upper corresponding mechanism being biased downwardly) by the spring loaded oilite slides indicated by the numeral 194, and the support mounts the hydraulic cylinder 196 which operates the rivet head 186.

When the riveter mechanisms are not being used, the spring loaded oilite slides force the riveter supporting mechanism upwardly and the upper structure operates to push the riveter supporting mechanism 184 downwardly. On the bottom portion of the riveter supporting mechanism 182 are serrated teeth 198, which when the riveter is in operation will bite into the boxings 134 and 136. A small film of oil is provided beneath the teeth, or between the teeth and the top surface of the boxings. In other words, when riveting pressure is applied, these teeth engage the boxings.

Referring specifically to FIGURES 14 and 16, when hydraulic motors 146 and 150 are simultaneously operated, this movement advances riveter supporting mechanisms 182 and 184 in the same direction. When these motors are reversed, these supporting mechanisms will be simultaneously moved in the opposite direction.

As shown in FIGURES 18 and 19, the riveter head 186 comprises a housing for the riveting member. The periphery of this riveting member is spaced from the inner walls of the rivet head 186 and mounted in this space 202 is a circular spring, the sides of which are corrugated, as seen in FIGURE 19 at 206. The die is indicated at 208 and the washer at 210.

FIGURE 13 diagrammatically illustrates in an exaggerated showing the transverse camber which sometimes occurs during the several operations leading up to the riveting operation. In such cases the holes which have been drilled through the web plate and stiffener members will be very slightly out of alignment. These holes are for the rivets, such as rivets 63, and other rivets which extend transversely over the web plate. Both of the rivet members are constructed as shown for example in FIGURE 19. The circular spring 202 permits the riveting member 200 to shift to right or left slightly in the rivet head 186 in order to provide a small amount of play in order that the riveting member 200 may move within the same. This movement is resisted by the circular spring 204, but after each riveting operation the spring 204 automatically repositions riveting member 200 in the rivet head 186.

Hydraulic motors are preferred for the operation of the parts shown in FIGURES 14, 16 and 17 because of the flexibility of feed motors, but as indicated above, electric motors may be substituted therefor.

The above description and drawings disclose a single embodiment of the invention, and specific language has been employed in describing the figures. It will, nevertheless, be understood that no limitations of the scope of the invention are thereby contemplated, and that various alterations and modifications may be made as would occur to one skilled in the art to which the invention relates.

I claim:
1. In an apparatus for the manufacture of a structural girder that includes the in-place assembly of the component parts thereof including the web plate means of the work piece; tool supporting means for supporting tools comprising a gantry movable over the web plate means, supporting means for supporting at least a portion of the work piece including the web plate means thereof for in-place assembly, said work piece supporting means being supported independently of said tool supporting means, said tool supporting means having a rack means thereon, said work supporting means comprising a plurality of spaced members each having a pivot means, a pinion means on said spaced members, said pinion means being positioned on said members for successive engagement and disengagement by said rack means as said gantry moves over said web plate means whereby to cause successive pivotal movement of said spaced members as different length-wise portions of said in-place web plate means is being worked upon, said spaced members being pivoted on horizontal axes which are transverse to the movements of said gantry as it moves along the length of said web plate means.

2. The structure of claim 1 wherein said spaced members are provided with means for supporting said web plate means in a horizontal position.

3. The structure of claim 2 wherein said spaced members are provided with adjustable means for supporting said web plate means in differently adjustable vertical positions.

4. The structure of claim 3 wherein separate adjustable means is provided on each spaced member for supporting the flanges of said girder whereby flanges of different sizes may be supported in position relative to the said web plate means of said girder to enable the production of girders of different dimensions.

5. The structure of claim 1 wherein means is provided for supporting the flanges of said girder in fixed position relative to said web plate means of said girder.

6. The structure of claim 5 wherein flange supporting means includes anti-friction rollers for proper lengthwise positioning of said flanges relative to said web plate means during the construction of said girder.

7. The structure of claim 1 wherein said rack means on said gantry includes a pair of spaced racks whereby to move said spaced members in opposite directions about their pivots in accordance with the back and forth movements of said gantry.

8. The structure of claim 1 wherein track means is provided for guiding the movements of said gantry along the length of said web plate means.

9. The structure of claim 1 wherein said rack means is supported on the side of the gantry and comprises a pair of vertically and laterally spaced racks whereby one of said racks engages said pinion means when said gantry moves in one direction and said other rack engages said pinion means when said gantry moves in the opposite direction.

10. The structure of claim 4 wherein said adjustable means on said spaced members are provided with clamping means for clamping said flanges in fixed position relative to said web plate means.

11. The structure of claim 1 wherein said gantry is provided with vertically spaced guides, riveting means mounted on each of said guides and means for moving such guides and said riveting means in unison in a direction transversely of the web plate.

12. The structure of claim 11 wherein at least one of said riveting means includes a rivet head, a riveting member in said head and spring means engaging said riveting member and rivet head.

13. The structure of claim 1 wherein said gantry is provided with vertically spaced guides, riveting means mounted on each of said guides and means for moving such guides and said riveting means in unison in a direction longitudinally of the web plate.

References Cited in the file of this patent

UNITED STATES PATENTS

| | | |
|---|---|---|
| 612,927 | Higgins | Oct. 25, 1898 |
| 1,131,777 | Gage | Mar. 16, 1915 |
| 1,158,874 | Walker | Nov. 2, 1915 |
| 1,332,519 | Reynolds | Mar. 2, 1920 |
| 1,491,902 | Coble | Apr. 29, 1924 |
| 1,676,258 | Fork | July 10, 1928 |
| 1,913,097 | Wallis | June 6, 1933 |
| 2,182,902 | Nye | Dec. 12, 1939 |
| 2,262,432 | Rodder | Nov. 11, 1941 |
| 2,369,467 | Kerr | Feb. 13, 1945 |
| 2,374,874 | McKee | May 1, 1945 |
| 2,446,438 | Strock | Aug. 3, 1948 |
| 2,489,377 | Hendrixson | Nov. 29, 1949 |
| 2,542,986 | Bowen | Feb. 27, 1951 |
| 2,577,766 | Johnson | Dec. 11, 1951 |
| 2,623,419 | Wales | Dec. 30, 1952 |
| 2,669,135 | Moore | Feb. 16, 1954 |
| 2,754,566 | Broden | July 17, 1956 |
| 2,845,171 | Heym | July 29, 1958 |
| 2,889,945 | Holsclaw | June 9, 1959 |